[redacted]
April 12, 1938.
C. H. SMOOT
REMOTE INDICATOR OR REGULATOR
Original Filed March 15, 1929
Re. 20,695
Orig. 1,954,850
Fig. 1
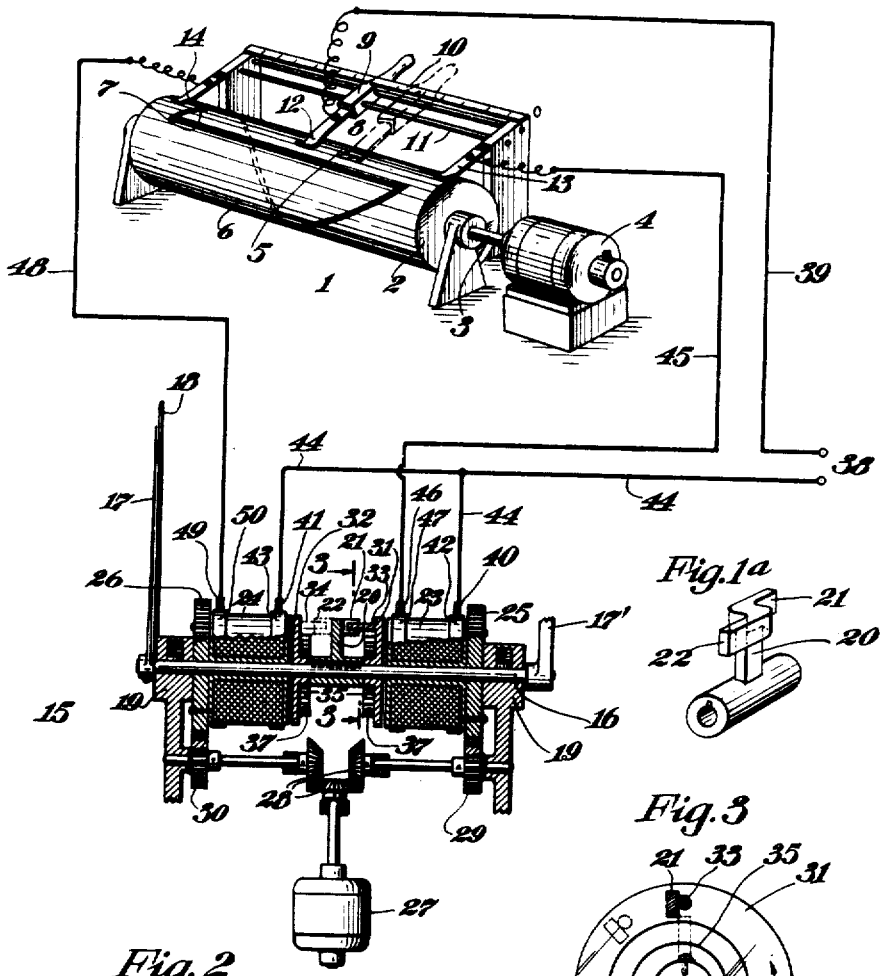
Fig. 1a
Fig. 3
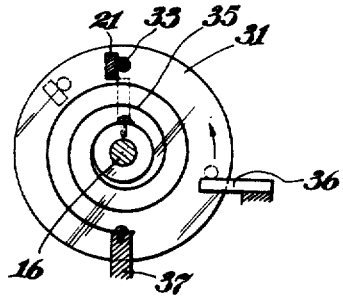
Fig. 2
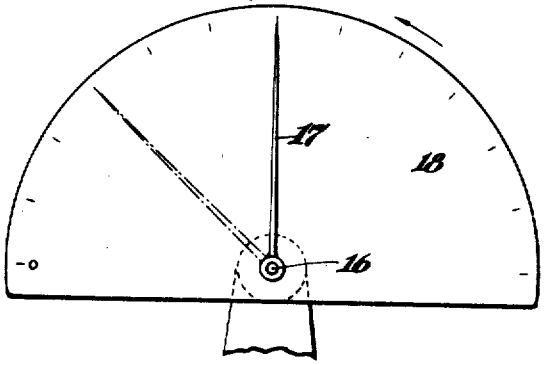
INVENTOR
Charles H. Smoot,
BY
Eyer, Scott & Kerl
ATTORNEYS Reissued Apr. 12, 1938

Re. 20,695

UNITED STATES PATENT OFFICE 20,695

REMOTE INDICATOR OR REGULATOR

Charles H. Smoot, deceased, late of Maplewood, N. J., by Katherine Smoot, Maplewood, N. J., assignee Original No. 1,954,850, dated April 17, 1934, Serial No. 347,254, March 15, 1929. Application for reissue November 14, 1935, Serial No. 49,776

13 Claims. (Cl. 177—351)

This invention comprises novel remote indicating or regulating apparatus or telemetric system which may be used to cause one or a plurality of indicators or regulators at remote points to move either exactly with, or in some definite relation to, the movement of an indicator or regulator at another point. The invention comprises apparatus for this purpose, that is, rugged and of simple construction and capable of causing movement of relatively heavy indicating or regulating members without sacrificing accuracy. The invention is primarily directed to novel mechanical and electrical apparatus, including a transmitting device, and one or a plurality of receiving devices, and as such is not concerned with any one of the particular uses for which such apparatus may be advantageously employed. In the interest of clarity, however, the invention will be described as applied to the indication at one point of the position of a member at a remote point, it being understood, of course, that this is by way of illustration only.

For a better understanding of the novel features of the invention, reference should be had to the accompanying drawing, of which:

Figure 1 is a view partly in section of one modification of the invention;

Figure 1*a* is an enlarged view in perspective of a detail of Figure 1;

Figure 2 is a view of the indicating device at the receiving station, and

Figure 3 is an enlarged sectional view on the line 3—3 of Figure 1.

Referring to the drawing a transmitting device 1 comprises a drum 2 mounted on a suitably journaled shaft 3 of a motor 4 for driving the drum at a constant speed. The cylindrical surface of the drum is of electrical conducting material divided into two parts 5 and 6, electrically insulated from each other by a band 7 of insulating material. A movable member 8, comprising in the modification illustrated, a body 9 adapted to be positioned manually with respect to a scale 10 by sliding along support bars 11, carries an electrical contact 12 in sliding engagement with the surface of drum 2. Contact 12 is thus alternately connected with parts 5 and 6 for periods of time depending both upon the manner in which band 7 divides the surface of the drum, and upon the longitudinal position of member 8 with respect to the drum. Stationary contacts 13 and 14 in sliding engagement with parts 5 and 6 respectively, are mounted at either end of the drum and are electrically insulated from each other and from contact 12.

A receiving device 15, located at some point remote from the device 1 comprises a movable shaft 16 carrying in this instance a needle 17 adapted to move over a scale 18 to indicate thereupon a position corresponding to the position of member 8 along the scale 10 of the transmitting device. The shaft 16 is suitably journaled in fixed bearings 19, and has keyed thereon a member 20 having projecting portions 21 and 22, (see Figure 1*a*). Rotatably mounted upon shaft 16 are two electromagnets 23 and 24 mounted on gears 25 and 26 respectively, which are rotated upon the shaft in opposite directions by suitable gearing to a motor 27. As shown, the gearing comprises bevel gears 28 and pinions 29 and 30 coacting with gears 25 and 26 respectively. Armatures 31 and 32 also rotatably mounted on shaft 16 are respectively associated with electromagnets 23 and 24 and are rotated when attracted to their respective electromagnets by energization thereof. Armature 31, when rotated, brings a finger 33 which is carried by the armature, into engagement with the projection 21 on the member 20 and serves to turn shaft 16 in the direction of the arrow in Figures 2 and 3. Similarly a finger 34 on armature 32 engages projection 22 to turn shaft 16 in the opposite direction when electromagnet 24 is energized. Coiled springs 35 maintain armatures 31 and 32 with their respective fingers 33 and 34 held against fixed stops 36 during de-energization of the respective electromagnets. The springs 35 are each attached at one end to stationary parts 37 and at the other end to hub portions of the respective armatures.

Any suitable source of electromotive force is indicated in Figure 1 by the terminals 38. One of the terminals 38 is connected by lead wire 39 to sliding contact 12 of device 1 and the other terminal is connected by connector 44 to brushes 40 and 41 in sliding contact respectively with terminal rings 42 and 43 of electromagnets 23 and 24 respectively. A lead wire 45 connects contact 13 with a brush 46 in contact with the other terminal ring 47 of electromagnet 23 and similarly a wire 48 connects contact 14 with brush 49 in contact with the other terminal ring 50 of electromagnet 24.

Motors 4 and 27 may be any suitable type of electric motors and are preferably operated synchronously.

In operation when member 8 is in the position shown, with its contact 12 in engagement with substantially the midportion of the drum, and when band 7 divides the surface of the drum into two symmetrical equal parts, as shown, then contact 12 is alternately electrically connected to contact 13 and 14 for equal periods of time, each corresponding to a half-rotation of drum 2. Electromagnets 23 and 24 are thus alternately energized for equal periods of time, magnet 23 being energized when contact 12 engages part 5, and magnet 24 being energized when contact 12 engages part 6. Energization of magnet 23 causes armature 31 to be attracted thereto and to rotate in the direction of the arrow in Figure 3. Preferably the gearing to motor 27, and the relative speeds of motors 4 and 27 are so designed as to cause an angular rotation of 90° of armatures 31 and 32 to occur when contact 12 engages parts 5 and 6 respectively for equal periods of time. During each such rotation armatures 31 and 32 are turned sufficiently against the tension of the respective springs 35 as to bring fingers 33 and 34 to the upper central position indicated in Figure 1 in full lines for finger 33 and in dotted lines for finger 34. During the alternate periods of deenergization of magnets 23 and 24, the springs 35 return the armatures to the position where their respective fingers rest against stops 36. Member 20, if not already in the vertical position illustrated, is thus rotated by one or the other of fingers 33 or 34 to such position. Needle 17 is thus brought to the central position on scale 18 and indicates thereupon that member 8 of the transmitting device is at the central position along scale 10. If now, member 8 is shifted along scale 10 to the right to the position indicated in dotted lines in Figure 1, magnet 23 will be energized during three quarters of each revolution of drum 2 and magnet 24 will be energized during the remaining quarter revolution. Armature 31 will therefore be rotated through 135° and armature 32 through only 45° with the result that member 20 will be shifted by finger 33 to turn shaft 16 through 45°, and needle 17 will correspondingly be shifted to the position indicated in dotted lines in Figure 2. Conversely a shift of member 8 to the left in Figure 1 will cause magnet 24 to be energized for relatively longer periods of time than magnet 23 and consequently finger 34 will turn shaft 16 by engagement with projection 22 by such an amount as to cause needle 17 to take up a position upon scale 18 so as to correspond with the position of member 8 along scale 10.

From the above description it will be apparent that for each shift of member 8, only one or the other of fingers 33 and 34 effect the actual rotation of shaft 16 by engagement with one of the projections on member 20; the other finger merely approaching engagement with member 20 and then being immediately retracted therefrom by spring 35. To insure no overtravel of shaft 16 and consequent vibration of needle 17, frictional means, such as spring pressed bearings 38, are provided.

The apparatus is not limited to the duplication of the movement of member 8 by needle 17 but may be readily arranged, by varying the shape of parts 5 and 6, to maintain any desired relation between the two movements. For example, the insulating band 7 might be so positioned on the surface of drum 2 as to cause the end of needle 17 to shift a distance along scale 18 corresponding to the square root of the distance through which member 8 has been moved along scale 10. This would be of advantage in the case where member 9 was moved automatically in response to the square of a variable function, such as electric current, and it was desired to indicate the linear variations of the function upon scale 18.

Where indications are desired at a number of different stations, a plurality of devices 15, one located at each of the stations, are connected with their corresponding magnets in parallel. Where it is desired to effect a control at the receiving end, instead of, or in addition to, the indicating function of device 15, it is only necessary to utilize the rotation of shaft 16 to position a damper, valve, etc., or in the case where the well known type of balanced regulator is employed, to vary the controlling force upon the regulator balance lever. In Figure 1 there is indicated at 17' an arm mounted on shaft 16 to which may be connected the regulator or other element to be controlled by the movement of shaft 16 when using the device 15 as a regulator.

If, instead of regulation or synchronous indication at a remote point, it was only desired to know the maximum position to which member 8 had been moved during a certain period, electromagnet 23 and its associated parts could be removed, and, conversely, if knowledge of the minimum position only was desired, magnet 24 and associated parts could be removed.

The invention has now been described and some of the many uses for which it may advantageously be employed have been indicated. The invention should not be limited, beyond the scope of the appended claims to the particular arrangement described as obviously variations in part thereof could readily be made without departing from the spirit of the invention.

What is claimed is:

1. In apparatus of the class described, the combination comprising a control member, a controlled member movable throughout a predetermined range, an actuating device in the path of movement of said controlled member and operable to move the same in one direction, a second actuating device in the path of movement of said controlled member and operable to move the same in the other direction, means associated with each of said devices normally biasing said devices to opposite ends of the range of said controlled member, continuously operating driving means, and means for coupling the driving means with each of said actuating devices to drive the same against their respective bias for periods of time depending upon the position of said control member.

2. The combination according to claim 1 wherein said last mentioned means include a continuously rotating drum having its surface divided into two electrically conducting mutually insulated parts, an electrical contact movable by said control member longitudinally along said drum and in contact with the surface thereof, a source of electrical energy connected to said contact and electromagnetic means so connected with said source and with said insulated parts as to couple one of said actuating devices to the driving means when said contact engages one of said insulated parts and to couple the other of said actuating devices to the driving means when said contact engages the other of said parts.

3. In apparatus of the class described, a control member, a controlled member movable in either direction throughout a predetermined range, an actuating device operable to engage and move said controlled member throughout said range in one direction only and biased toward disengaging position, a second actuating device operable to engage and move said controlled member throughout said range in the opposite direction only and biased toward disengaging position and means for driving said devices away from their respective biased positions through distances each of which depends upon the position of said control member, and the sum of which is constant.

4. In apparatus of the class described, a shaft rotatable in either direction through a predetermined range, a device rotatably mounted on said shaft and biased toward one end of said range, a second device rotatably mounted on said shaft and biased toward the other end of said range, a member carried by said shaft and having projections extending into the path of travel of said devices, means for rotating said devices away from their respective biased positions and toward engaging position with said member through angles the sum of which is equal to the total predetermined angular range of movement of said shaft, a movable control member remote from said shaft and means controlled by the position of said control member for determining the angular motion of said devices.

5. In apparatus of the class described a source of power and a cylindrical drum continuously driven thereby, the surface of said drum being of electrically conducting material and divided into two mutually insulated parts, a control member movable longitudinally along said drum and provided with an electrical contact adapted to alternately engage said parts, a controlled member remote from said control member, driving means adapted to drive said controlled member in either direction, and electromagnetic means in electrical communication with said parts for coupling said controlled member to said driving means when said contact engages one of said parts to drive said controlled member in one direction upon movement of said control member in one direction, and for coupling said controlled member to said driving means when said contact engages the other of said parts to drive said controlled member in the other direction upon movement of said control member in the other direction.

6. In apparatus of the class described a controlled element adapted to be positioned throughout a predetermined range from a minimum to a maximum position, a member biased toward minimum position and adapted to move said controlled element toward maximum position by engagement therewith, a member biased toward maximum position and adapted to move said controlled element toward minimum position by engagement therewith, means for alternately driving said members against their respective bias at uniform speed for periods of time which vary but whose sum is constant whereby said controlled element will be positioned in accordance with the periods of time during which said members are driven.

7. An indicator adapted to be controlled by a series of impulses of varying length and comprising an indicator member, friction means for holding said member in any position to which it may be shifted, an angularly movable device for shifting said indicator having operatively associated therewith two driven parts, two power-operated parts arranged for operative engagement with said driven parts respectively, and means controlled by said impulses for causing said power-operated parts alternately to move in the direction to drive said driven parts in opposite directions for a duration of time controlled by the length of said impulses.

8. A telemetric system comprising sending means for generating a series of electrical impulses of varying length and an indicator electrically connected therewith and comprising an indicator member, friction means for holding said member in any position to which it may be shifted, an angularly movable device for shifting said indicator having operatively associated therewith two driven parts, two power-operated parts arranged for operative engagement with said driven parts respectively, and electrical means controlled by said impulses for causing said power-operated parts alternately to move in the direction to drive said driven parts in opposite directions for a duration of time controlled by the length of said impulses.

9. A receiver for a telemetric system of the impulse type comprising an indicator arm, friction means for holding said arm yieldingly in any angular position, a motor, two gearings oppositely driven by said motor, two members each driven in one direction by one of said gearings and each having a spring return against a stop predetermining its position, said members being alternately driven under the control of received impulses, and parts in the paths of said members and operatively connected with said indicator arm to shift it when one or the other of said parts is engaged and moved by the corresponding one of said members.

10. A telemetric system comprising sending means for generating impulses of different duration including a continuously rotating part and an indicator electrically connected to said sending means and including a pointer, oppositely rotatable members for moving said pointer in opposite directions, power means for continuously rotating said members, and electromagnetic means for controlling operative engagement of said members with the pointer and connected to said sending means to operatively engage first one and then the other of said members with the pointer for lengths of time each depending on the duration of said impulses and the sum of which is constant.

11. A telemetric system comprising a receiving device having an indicator movable in opposite directions, a transmitter operating in cycles and sending an impulse in each cycle, means movable in one direction to position the indicator in said direction in response to said impulse in said cycle, and means movable in the opposite direction to position the indicator in the opposite direction during the remainder of the cycle, the sum of said positioning movements being constant.

12. A telemetric system comprising a receiving device having an indicator movable in opposite directions, a transmitter operating in cycles and sending an impulse in each cycle, of a length depending upon the then value of a variable quantity to be telemetered, a source of power, two mechanisms continuously driven thereby and including parts adapted to be held stationary or to be driven by said mechanisms in opposite directions, means controlled by said impulse in said cycle to connect one of said parts to the corresponding mechanism to position the indicator in one direction, and means operable during the remainder of the cycle to connect the other of said parts to the other mechanism to position the indicator in the opposite direction, the sum of the positioning movements of said parts being constant.

13. A telemetric system comprising a receiving device having an indicator movable in opposite directions, a transmitter operating in cycles and sending an impulse in each cycle of a length depending upon the then value of a variable quantity to be telemetered, a continuously running motor, two mechanisms continuously driven by said motor in opposite directions and including parts adapted to be held stationary or to be connected to said mechanisms to be driven thereby in opposite directions, means controlled by said impulse in said cycle to connect one of said parts to the corresponding mechanism to position the indicator in one direction, and means operable during the remainder of the cycle to connect the other of said parts to the other mechanism to position the indicator in the opposite direction, the sum of the positioning movements of said parts being constant.

KATHERINE SMOOT,
*Assignee of Charles H. Smoot, Deceased.*

Disclaimer

Re. 20,695.—*Charles H. Smoot*, deceased, late of Maplewood, N. J., REMOTE INDICATOR OR REGULATOR. Patent dated Apr. 12, 1938. Disclaimer filed Sept. 10, 1949, by the assignee, *Katherine Smoot*; the licensees, *Smoot Engineering Company* and *Republic Flow Meters Company*, consenting and approving.

Hereby enters this disclaimer to claims 1, 3, 4, 6, and 11 of said reissue patent. [*Official Gazette October 18, 1949.*]